(12) United States Patent
Schneider et al.

(10) Patent No.: US 10,583,731 B2
(45) Date of Patent: Mar. 10, 2020

(54) METHOD FOR OPERATING A DRIVE DEVICE FOR A MOTOR VEHICLE AND CORRESPONDING DRIVE DEVICE

(71) Applicant: AUDI AG, Ingolstadt (DE)

(72) Inventors: Michael Schneider, Stammham (DE); Henrik Kaartometsä, Gaimersheim (DE); Bernhard Brückl, Gerolsbach (DE)

(73) Assignee: AUDI AG, Ingolstadt (DE)

( * ) Notice: Subject to any disclaimer, the term of this patent is extended or adjusted under 35 U.S.C. 154(b) by 63 days.

(21) Appl. No.: 15/843,058

(22) Filed: Dec. 15, 2017

(65) Prior Publication Data

US 2018/0208045 A1    Jul. 26, 2018

(30) Foreign Application Priority Data

Jan. 23, 2017   (DE) .................. 10 2017 200 977

(51) Int. Cl.
*B60K 6/485* (2007.10)
*B60K 6/387* (2007.10)
(Continued)

(52) U.S. Cl.
CPC .............. *B60K 6/485* (2013.01); *B60K 6/387* (2013.01); *B60K 6/547* (2013.01);
(Continued)

(58) Field of Classification Search
CPC ............ B60K 2006/4825; B60K 6/387; B60K 6/485; B60K 6/547; B60L 15/2072;
(Continued)

(56) References Cited

U.S. PATENT DOCUMENTS 6,655,485 B1 * 12/2003 Ito ..................... B60K 6/387
                                                    180/65.6
9,316,149 B2   4/2016 Zollner et al.
(Continued)

FOREIGN PATENT DOCUMENTS

DE   502005001708 T2   5/2008
DE   102007001424 A1   7/2008
(Continued)

OTHER PUBLICATIONS

German Examination Report dated Dec. 22, 2017 in corresponding German Application No. DE102017200977.2; 10 pgs.
(Continued)

*Primary Examiner* — Jacob M Amick
*Assistant Examiner* — Ruben Picon-Feliciano
(74) *Attorney, Agent, or Firm* — Maier & Maier, PLLC

(57) ABSTRACT

A method for operating a drive device for a motor vehicle, which has an internal combustion engine, an electric motor, and a gearshift transmission. A drive shaft of the internal combustion engine can be coupled by a shift clutch to a motor shaft of the electric motor and the motor shaft is coupled to a transmission input shaft of the gearshift transmission. A driven shaft of the drive device is coupled to or can be coupled to a transmission output shaft of the gearshift transmission. In a first shifting state, the shift clutch is disengaged for decoupling of the internal combustion engine and the electric motor and, in a second shifting state, is engaged for coupling of the internal combustion engine and the electric motor.

6 Claims, 1 Drawing Sheet

(51) Int. Cl.
  *B60W 10/11* (2012.01)
  *B60K 6/547* (2007.10)
  *B60W 10/02* (2006.01)
  *B60W 10/06* (2006.01)
  *B60W 20/50* (2016.01)
  *B60W 10/08* (2006.01)
  *B60L 15/20* (2006.01)
  *B60W 20/40* (2016.01)
  *F02N 11/08* (2006.01)
  *F02N 11/10* (2006.01)
  *B60W 50/02* (2012.01)
  *B60K 6/48* (2007.10)

(52) U.S. Cl.
  CPC ......... *B60L 15/2072* (2013.01); *B60W 10/02* (2013.01); *B60W 10/023* (2013.01); *B60W 10/06* (2013.01); *B60W 10/08* (2013.01); *B60W 10/11* (2013.01); *B60W 20/40* (2013.01); *B60W 20/50* (2013.01); *F02N 11/0814* (2013.01); *F02N 11/103* (2013.01); *B60K 2006/4825* (2013.01); *B60L 2240/12* (2013.01); *B60L 2240/507* (2013.01); *B60W 2050/0215* (2013.01); *B60W 2510/0652* (2013.01); *B60W 2510/082* (2013.01); *B60W 2510/104* (2013.01); *B60W 2710/021* (2013.01); *B60W 2710/0644* (2013.01); *B60W 2710/1005* (2013.01); *Y02T 10/6252* (2013.01); *Y02T 10/6286* (2013.01); *Y02T 10/7258* (2013.01)

(58) Field of Classification Search
  CPC .......... B60L 2240/12; B60L 2240/507; B60W 10/02; B60W 10/023; B60W 10/06; B60W 10/08; B60W 10/11; B60W 2050/0215; B60W 20/40; B60W 20/50; B60W 2510/0652; B60W 2510/082; B60W 2510/104; B60W 2710/021; B60W 2710/0644; B60W 2710/1005; F02N 11/0814; F02N 11/103; Y02T 10/6252; Y02T 10/6286; Y02T 10/7258
  See application file for complete search history.

(56) References Cited

U.S. PATENT DOCUMENTS

| | | | |
|---|---|---|---|
| 2004/0034461 A1* | 2/2004 | Kadota | B60K 6/44 701/67 |
| 2008/0129049 A1 | 6/2008 | Sauvlet et al. | |
| 2010/0151990 A1* | 6/2010 | Seel | B60K 6/48 477/5 |
| 2016/0280217 A1* | 9/2016 | Sato | B60W 10/10 |
| 2018/0066718 A1* | 3/2018 | Kim | F16D 48/06 |

FOREIGN PATENT DOCUMENTS

| | | |
|---|---|---|
| DE | 10 2007 055 826 A1 | 6/2009 |
| DE | 10 2007 055 828 A1 | 6/2009 |
| DE | 10 2008 002 383 A1 | 12/2009 |
| DE | 102011079079 A1 | 1/2013 |
| DE | 102012208845 A1 | 11/2013 |
| EP | 3088228 A2 | 11/2016 |

OTHER PUBLICATIONS

European Search Report dated May 29, 2018, in corresponding EP Application No. 17202475.4 (8 pgs.).

* cited by examiner

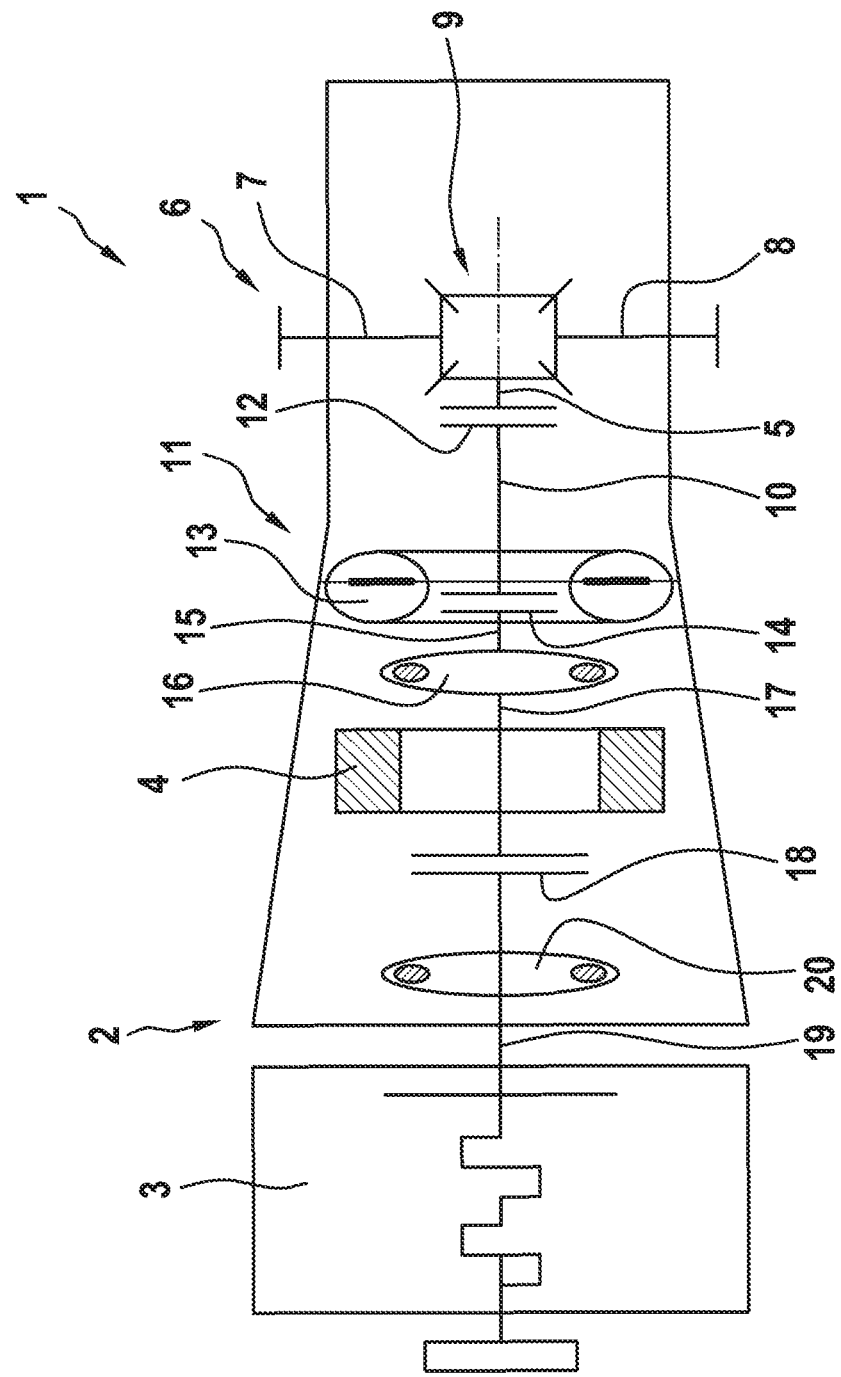

METHOD FOR OPERATING A DRIVE DEVICE FOR A MOTOR VEHICLE AND CORRESPONDING DRIVE DEVICE

FIELD

The invention relates to a method for operating a drive device for a motor vehicle, which has an internal combustion engine, an electric motor, and a gearshift transmission, wherein a drive shaft of the internal combustion engine can be coupled to a motor shaft of the electric motor by means of a shift clutch and the motor shaft is coupled to a transmission input shaft of the gearshift transmission, wherein a driven shaft of the drive device is coupled to or can be coupled to a transmission output shaft of the gearshift transmission, and wherein, in a first shifting state, the shift clutch is opened or disengaged for decoupling of the internal combustion engine and the electric motor, and, in a second shifting state, is closed or engaged for coupling of the internal combustion engine and the electric motor. The invention further relates to a drive device.

BACKGROUND

The drive device serves to drive the motor vehicle and accordingly, therefore, to supply a torque directed at driving the motor vehicle. The drive device is equipped with a plurality of drive assemblies, wherein a first drive assembly is designed as an internal combustion engine and a second drive assembly is designed as an electric motor. The drive device is accordingly a hybrid drive device. In addition to the drive assemblies, the drive device is equipped with the gearshift transmission, which, in turn, has a transmission input shaft and a transmission output shaft. By use of the gearshift transmission, it is possible to adjust different gear ratios between the transmission input shaft and the transmission output shaft or to adjust a chosen gear ratio from a plurality of different gear ratios.

The internal combustion engine is equipped with the drive shaft, which, for example, corresponds to a crankshaft of the internal combustion engine, or is coupled to it, preferably rigidly and/or permanently. In contrast, the electric motor has the motor shaft, which, in turn, is coupled to a rotor of the electric motor, likewise preferably rigidly and/or permanently. The drive shaft of the internal combustion engine and the motor shaft of the electric motor can be coupled by means of the shift clutch. This means that, in the first shifting state of the shift clutch, the drive shaft is coupled to the motor shaft, preferably rigidly, that is, in a rotationally fixed manner or in a slip-free manner. For this purpose, in the first shifting state—for a corresponding design of the shift clutch as, for example, a multi-plate clutch—a clutch overpressure of the shift clutch can be provided, so that, for torques that usually occur during the operation of the drive device, no clutch slippage of the shift clutch arises.

In contrast, in the second shifting state, the shift clutch is at least partially and, in particular, completely disengaged. Preferably, therefore, in the second shifting state, the drive shaft is completely decoupled from the motor shaft. The motor shaft of the electric motor is coupled, preferably rigidly and/or permanently, to the transmission input shaft of the gearshift transmission, or at least can be coupled to it. The transmission output shaft of the gearshift transmission, in turn, is coupled to the driven shaft of the drive device, in particular rigidly and/or permanently, and/or at least can be coupled to it.

The driven shaft of the drive device is understood to mean a shaft at which the drive device supplies the drive torque to be used for driving the motor vehicle.

The driven shaft is accordingly coupled to a wheel axle of the motor vehicle, for example, or at least is coupled to one wheel of the motor vehicle, in particular rigidly and/or permanently, or at least can be coupled to it. For example, the motor shaft of the electric motor is coupled to the shift clutch, on the one hand, and the motor shaft of the electric motor is linked to the transmission input shaft, on the other hand. The electric motor can be arranged coaxially to the transmission input shaft. Other arrangements of the electric motor can also be relaized, however.

SUMMARY

The object of the invention is to propose a method for operating a drive device for a motor vehicle, which has advantages in comparison to known methods and, in particular, makes possible a reliable and comfortable coupling of the internal combustion engine to the electric motor, preferably during a startup of the internal combustion engine.

It is thereby provided that, in a first mode of operation, during a shift from the first shifting state to the second shifting state, the engaging of the shift clutch is delayed when the difference between a speed gradient of the drive shaft and a speed gradient of the motor shaft exceeds a speed gradient threshold value and/or the speed gradients have different signs. The speed gradient is understood to mean the gradient of the speed over time. When the speed increases, there is present a positive sign and, when the speed decreases, there is present a negative sign.

During a shift from the first shifting state to the second shifting state, the internal combustion engine shall be coupled to the electric motor; that is, the internal combustion engine shall undergo a transition from the decoupled state to the at least partially coupled state, in particular, however, the rigidly coupled state. Accordingly, at the beginning of the shift, the internal combustion engine is decoupled, namely completely decoupled, from the electric motor. In contrast, after the shift, the internal combustion engine is coupled to the electric motor. Accordingly, it is necessary during the shift to engage the shift clutch in order to achieve the coupling between the internal combustion engine and the electric motor.

This engaging of the shift clutch is delayed or postponed, however, when at least one specific condition is met. This specific condition can be, for example, that the difference between the speed gradients, that is, between the speed gradient of the drive shaft and the speed gradient of the motor shaft, exceeds the speed gradient threshold value, that is, is greater than the latter. Another condition is that the speed gradients, that is, once again, the speed gradient of the drive shaft and the speed gradient of the motor shaft, have different signs. If exactly one or at least one of the mentioned conditions is met; then the engaging of the shift clutch is initially not carried out. Obviously, it can also be provided that the engaging is delayed only when a plurality of the mentioned conditions are met.

For example, during the shift from the first shifting state to the second shifting state, it is provided that the speed of the internal combustion engine or of the drive shaft is matched to the speed of the electric motor or to the speed of the motor shaft and subsequently the shift clutch is engaged. Even in the case of matching speeds or at least nearly matching speeds, however, the engaging of the shift clutch can seem uncomfortable for the occupants or a driver of the motor vehicle when, at the same time, the speed gradients differ too strongly from each other or have different signs. The latter case can arise, for example, when the speed of the drive shaft is increased and, at the same time, the speed of the motor shaft is decreased. The increase in the speed of the drive shaft and the decrease in the speed of the motor shaft can by all means result in a matching of the speeds of the drive shaft and the motor shaft.

If the shift clutch is then engaged, however, it is necessary initially, in spite of the matching speeds, to match the speed gradients to each other. In the case of too strong a difference of the speed gradients, this can lead to a clearly perceptible change in the speed. For this reason, it is initially provided that the engaging of the shift clutch be delayed, that is, not carried out. In particular, during the delay, the momentarily existing shifting state of the clutch is kept constant and, in particular, the shift clutch is kept in the first shifting state; that is, it is not taken out of the first shifting state.

In the scope of another embodiment of the invention, it is provided that the shift from the first shifting state to the second shifting state is carried out during a startup of the internal combustion engine. The startup of the internal combustion engine is understood to mean that the internal combustion engine is brought from a speed that is less than a minimum speed and/or an idling speed to the minimum speed or the idling speed. The minimum speed is preferably understood to mean a speed of the internal combustion engine at which it can automatically increase its speed, that is, without the influence of an external torque, during fueled operation. The idling speed, in contrast, is the speed of the internal combustion engine that is usually adjusted for it when the internal combustion engine is not intended to contribute to supplying the drive torque at the driven shaft. The idling speed is thereby usually greater than the minimum speed and preferably chosen in such a way that the operation of the internal combustion engine is as smooth and noise-free as possible.

The startup of the internal combustion engine can occur both in the course of a cold start and in the course of a warm start or restart. Likewise, the startup of the internal combustion engine can occur from any initial speed, for example, from an initial speed of zero, that is, from a standstill of the internal combustion engine. The startup of the internal combustion engine can obviously also be undertaken from an initial speed that is different from zero. This is the case, in particular, if the startup occurs at such a short time interval from a directly preceding shut-off of the internal combustion engine that the internal combustion engine has not yet come completely to a standstill.

During the startup of the internal combustion engine, the speed of the internal combustion engine is increased; that is, the speed gradient of the drive shaft is therefore greater than zero. The delay of the engaging of the shift clutch is then carried out, for example, when a speed reduction of the electric motor coincides with the startup of the internal combustion engine, that is, occurs at the same time. In this case, the speed gradients have different signs, so that, even at matching speeds, usually no comfortable engaging of the shift clutch is possible.

An enhancement of the invention provides that, during the shift from the first shifting state to the second shifting state, a shift in gear from an initial gear to a target gear is carried out by means of the gearshift transmission. The initial gear and the target gear have different gear ratios, so that, between the transmission output shaft and the transmission input shaft and consequently the motor shaft of the electric motor, there is a different gear ratio prior to the shift in gear than after the shift in gear.

If, then, the shift from the first shifting state to the second shifting state coincides with this shift in gear, it is possible, in spite of an essentially constant traveling speed of the motor vehicle and consequently an essentially constant speed of the transmission output shaft, for a quick change in the speed of the transmission input shaft and accordingly a large speed gradient of the motor shaft to exist. In this case, the engaging of the shift clutch is to be initially delayed. This is to occur, in particular, if the shift in gear additionally coincides with the startup of the internal combustion engine and the shift in gear occurs in the course of a downshift, that is, in the course of a reduction of the driving gear engaged by means of the gearshift transmission, so that the initial gear is higher than the target gear. In this case, an increase in the speed of the transmission input shaft and accordingly of the motor shaft occurs.

Another embodiment of the invention provides that, in the case of the delay in the engaging of the shift clutch, a desired speed is adjusted at the internal combustion engine, said desired speed being determined from a speed of the transmission output shaft and the target gear. Initially, therefore, the speed of the transmission output shaft and of the target gear are established. Subsequently, the desired speed is determined from these values. The desired speed here preferably corresponds to the speed of the transmission input shaft that results after engagement of the target gear when the speed of the transmission output shaft is present. The desired speed is accordingly the speed that results from the speed of the transmission output shaft and the gear ratio of the target gear.

The desired speed is adjusted at the internal combustion engine and controls or regulates an actual speed of the internal combustion engine to the desired speed. In particular, this takes place in such a way that, after completion of the shift in gear, the internal combustion engine is already operated at an actual speed corresponding to the desired speed by means of the gearshift transmission. Therefore, in a proactive manner, the speed of the transmission input shaft that is expected to exist after the shift in gear and accordingly the speed of the motor shaft are determined and the internal combustion engine is already prepared beforehand for the engaging of the shift clutch through adjustment of the corresponding desired speed.

Another embodiment of the invention provides that the delay is terminated and the shift clutch is engaged when the actual speed corresponds to the desired speed and/or the difference is less than or equal to the speed gradient threshold value and/or the speed gradients have the same signs. The delay is accordingly terminated when exactly one or at least one of the mentioned conditions is met. Preferably, however, a plurality of the mentioned conditions have to be met in order to terminate the delay. In particular, it is provided that, at all times, the actual speed has to match the desired speed and at least one of the other conditions is met.

A preferred embodiment of the invention provides that, when there is a shift from the first shifting state to the second shifting state, the engaging of the shift clutch is carried out in a second operating mode immediately and, in particular, regardless of the difference between the speed gradients and/or the signs. The delay of the engaging of the shift clutch is therefore conducted only in the first operating mode, but not in the second operating mode. In the second operating mode, the engaging of the shift clutch is carried out immediately during the shift, that is, without any delay. The engaging of the shift clutch is consequently independent of the difference between the speed gradients or the signs of the speed gradients.

Another preferred embodiment of the invention provides that a transition from the first operating mode to the second operating mode occurs when a predetermined torque that is adjusted at the drive device exceeds a torque threshold value, and/or a difference in the speed between the speed of the drive shaft and the speed of the motor shaft is less than a speed difference threshold value, and/or a converter slippage of a torque converter of the gearshift transmission is unknown, and/or a speed signal is invalid. For example, it is provided that, normally, the first operating mode is carried out and a transition to the second operating mode only occurs when exactly one, at least one, or a plurality or all of the mentioned conditions is or are met. In other words, there is a transition from the first operating mode to the second operating mode when a selection of the mentioned conditions are met. If the selection is not appropriate, however, then a transition from the second operating mode back to the first operating mode occurs.

The predetermined torque is, for example, a torque predetermined by a driver of the motor vehicle and/or by a driver-assist device. For example, the desired torque adjusted at the drive device corresponds to the predetermined torque. If the predetermined torque exceeds the torque threshold value, that is, if an especially high torque requirement exists, then it is advantageous to couple the internal combustion engine to the electric motor immediately. Additionally or alternatively, it can be checked whether the speed difference threshold value has dropped below the speed difference. The speed difference threshold value can fundamentally be established in any way; in particular, it can be chosen in such a way that, when the speed difference drops below it, a comfortable coupling of the internal combustion engine to the electric motor is possible. Furthermore, it can be checked whether the converter slippage of the torque converter is known or unknown. An unknown converter slippage exists, in particular, when a converter bridge clutch of the torque converter is disengaged, so that the adjusting slippage in the torque converter cannot be calculated. Furthermore, it can be checked whether the speed signal is valid or invalid. The speed signal is, for example, a signal corresponding to the rpm speed or the traveling speed.

Finally, in the scope of another embodiment of the invention, it is possible to provide that, in the second operating mode, the shift clutch is engaged prior to the shift in gear by means of the gearshift transmission. If the shift from the first shifting state to the second shifting state and the shift in gear overlap in time, then, in the second operating mode, the shift clutch is engaged as quickly as possible, namely before the shift in gear is carried out. In this way, it is possible to very rapidly supply the torque produced by the internal combustion engine at the driven shaft.

Another embodiment of the invention provides that the startup of the internal combustion engine is carried out through dragging or entrainment of the internal combustion engine by means of a starter and/or through only partial engaging of the shift clutch. In this way, the startup of the internal combustion engine can be carried out in each case either in a fueled or unfueled manner. In any case, the internal combustion engine is entrained. This can be realized by use of the starter, such as, for example, a belt starter, or through only partial engaging of the shift clutch. The only partial engaging of the shift clutch in the course of the startup of the internal combustion engine differs in this case from the engaging of the shift clutch when there is a shift from the first shifting state to the second shifting state. The engaging carried out during the shift occurs further than the engaging for entrainment of the internal combustion engine; in particular, in the former case, a higher clutch torque is adjusted than in the latter case.

An enhancement of the invention provides that a desired clutch torque used for startup of the internal combustion engine and to be adjusted at the shift clutch is determined from a temperature and/or a crankshaft position of the internal combustion engine—in particular, a crankshaft position during standstill of the internal combustion engine. The desired clutch torque is the torque that is to be transmitted by means of the shift clutch. An actual clutch torque that is in fact transmitted via the shift clutch is adjusted preferably to the desired clutch torque, in particular in a controlling or regulating manner.

The desired clutch torque is then determined on the basis of the temperature and/or the crankshaft position of the internal combustion engine. For example, the lower the temperature is, the higher is the desired clutch torque. As the temperature, for example, a temperature of the internal combustion engine is chosen, such as, for example a lubricant temperature. Additionally or alternatively, the crankshaft position that is present prior to the startup is taken, in particular when the internal combustion engine is at a standstill.

The crankshaft position defines, for example, an angle of rotation around which the crankshaft of the internal combustion engine has to be rotated until the top dead point is reached for that cylinder in which initially a compression and/or fuel injection is carried out. For a small angle of rotation, less mixture needs to be compressed than for a large angle of rotation, because the first cylinder to be fueled is positioned just in front of its the top dead point. Accordingly, the smaller the angle of rotation, the smaller the desired clutch torque is chosen.

Another preferred embodiment of the invention provides that the desired clutch torque is corrected upwards when the speed of the internal combustion engine is greater than zero at the beginning of the startup or when a period of time after the internal combustion engine has been shut off has dropped below the predetermined period of time, wherein the further the period of time drops below the predetermined period of time, the greater the desired clutch torque is chosen. It was already described above that the startup of the internal combustion engine can occur from any initial speed. If the internal combustion engine was shut off only a short time prior to the startup, then the speed is greater than zero. Accordingly, in the next cylinder in which a compression is to occur, a precompressed mixture is already present.

This makes necessary an increase in the desired clutch torque. For example, the increase in the desired clutch torque occurs within a specific speed range of the internal combustion engine. As a lower limit, this speed range has, for example, a speed of greater than zero, in particular infinitesimally greater than zero, at which the internal combustion engine is just barely still in rotation when it runs down. As an upper limit, the speed range can have a speed that is less than the minimum speed and/or the idling speed. In particular, the speed is at most 75%, at most 50%, at most 40%, at most 30%, or at most 25% of the minimum speed. If the speed of the internal combustion engine exceeds the speed range, that is, if it lies above it, then it is possible to dispense with an increase in the desired clutch torque, because the still rotating masses of the internal combustion engine assist the startup.

If, when the internal combustion engine runs down, a throttle valve is opened, then the cylinders of the internal combustion engine are still supplied with a full air charge. Accordingly, a precompressed air charge is present in the first cylinder to be compressed. This increased charging is slowly relieved owing to leakage of the cylinder through cylinder seals, for example, after the internal combustion engine has come to a stop. The increased charging in the first cylinder to be compressed shall be taken into consideration in calculating the desired clutch torque. Accordingly, the period of time prior to startup after the internal combustion engine has been shut down is taken into consideration and the desired clutch torque is corrected upwards when the period of time is less than the predetermined period of time. It is hereby provided that, the more the period of time drops below the predetermined period of time, the greater the desired clutch torque is chosen. For example, the desired clutch torque is reduced linearly over time after the internal combustion engine has been shut off.

Another embodiment of the invention provides that a drive torque, which can be supplied by means of the electric motor, is limited to a torque limit value, which is determined from a maximum drive torque of the electric motor and a torque reserve. The maximum drive torque corresponds to the maximum torque that can be supplied by means of the electric motor. The maximum drive torque thereby corresponds preferably to a nominal torque at which the electric motor can be operated permanently and continuously.

The torque limit value is determined from the maximum drive torque and the torque reserve. The torque limit value hereby corresponds to the maximum drive torque minus the torque reserve. Through provision of the torque reserve, it is ensured that, at all times, a reliable startup of the internal combustion engine is possible by use of the electric motor. Accordingly, the drive torque that can be produced by the electric motor is limited to the torque limit value.

In the scope of another advantageous embodiment of the invention, it is provided that the torque reserve is determined from a drag torque that is required to start the internal combustion engine. The drag torque corresponds to the torque that is required for entrainment of the internal combustion engine and, in particular, for entraining it to the minimum speed and/or the idling speed. The torque reserve is then set equal to the drag torque, for example.

Another embodiment of the invention provides that the torque reserve is set equal to the drag torque when an actual torque of the electric motor is less than a maximum drive torque minus the drag torque, and it is otherwise set equal to the maximum drive torque minus the actual torque and subsequently increased. As a result, the torque reserve is supplied unnoticeably to the driver of the motor vehicle, namely by initially choosing the torque reserve in such a way that it does not influence the actual torque and it is subsequently slowly increased, so that the actual torque of the electric motor slowly declines.

The invention further relates to a drive device for a motor vehicle, in particular for carrying out the method described above, wherein the drive device has an internal combustion engine, an electric motor, and a gearshift transmission, wherein a drive shaft of the internal combustion engine can be coupled to a motor shaft of the electric motor by means of a shift clutch and the motor shaft is coupled to a transmission input shaft of the gearshift transmission, wherein a driven shaft of the gearshift transmission is coupled to or can be coupled to a transmission output shaft of the gearshift transmission, and wherein, in a first shifting state, the shift clutch is disengaged for decoupling of the internal combustion engine and the electric motor and, in a second shifting state, is engaged for coupling of the internal combustion engine and the electric motor.

It is thereby provided that the drive device is designed such that, when there is a shift from the first shifting state to the second shifting state, the engaging of the shift clutch is delayed in a first operating mode when the difference between a speed gradient of the drive shaft and a speed gradient of the motor shaft exceeds a speed gradient threshold value and/or the speed gradients have different signs.

The advantages of such a procedure or of a corresponding design of the drive device have already been addressed. Both the drive device and the method for the operation thereof can be developed further in accordance with the preceding statements, so that reference is accordingly made to the latter.

BRIEF DESCRIPTION OF THE FIGURES

The invention will be discussed below in detail on the basis of the exemplary embodiments illustrated in the drawing, without any limitation of the invention thereby ensuing. The sole FIGURE shows herein:

FIG. 1 shows a schematic illustration of a drive train 1 for a motor vehicle, which is not shown further.

DETAILED DESCRIPTION OF THE FIGURES

The drive train 1 is equipped with a drive device 2, which, in turn, has an internal combustion engine 3, an electric motor, and a driven shaft 5. The drive device 2 serves for driving at least one wheel axle 6 of the motor vehicle, which is composed of two axle members 7 and 8, which are coupled to the driven shaft 5 of the drive device 2 via a differential 9. The driven shaft 5 is coupled to a transmission output shaft 10 of a gearshift transmission 11 of the drive device 2, in particular rigidly and/or permanently and/or by means of an optional shift clutch 12.

The gearshift transmission 11 can have, for example, a torque converter 13, which is equipped with a converter bridge clutch 14. The gearshift transmission 11 is equipped with a transmission input shaft 15, which is preferably coupled permanently to the torque converter 13. The transmission input shaft 15 can be coupled, in particular rigidly and/or permanently, directly or—as illustrated here—via a damping device 16, such as, for example, a torsional vibration damper, to a motor shaft 17 of the electric motor 4. The electric motor 4 can be arranged coaxially to the transmission input shaft 15 and/or to the transmission output shaft 10.

An operative connection between the internal combustion engine 3 and the electric motor 4 can be adjusted by means of a shift clutch 18. The shift clutch 18 is present here between a drive shaft 19 of the internal combustion engine 3 and the motor shaft 17 of the electric motor 4. In addition, in the operative connection between the internal combustion engine 3 and the shift clutch 18, it is possible to provide optionally another damping device 20. The damping device 20 is preferably constructed as a dual mass flywheel.

In a first shifting state of the shift clutch 18, the internal combustion engine 3 is decoupled from the electric motor 4. In a second switching state, in contrast, it is coupled to the latter. Accordingly, the shift clutch 18 is disengaged in the first shifting state and, in particular, is completely disengaged, and, in the second shifting state, it is at least partially and preferably completely engaged. The complete engaging can be understood to mean an engaging of the shift clutch 18 with or without clutch overpressure.

If a shift from the first shifting state to the second shifting state is to occur, that is, the internal combustion engine 3 and the electric motor 4 are initially decoupled from each other; then the engaging of the shift clutch 18 required for this purpose is delayed when a difference between a speed gradient of the drive shaft 19 and a speed gradient of the motor shaft 17 exceeds a speed gradient threshold value, and/or the speed gradients have different signs. This occurs more preferably when the shift is carried out during a startup of the internal combustion engine 3 and, at the same time, a shift in gear takes place by means of the gearshift transmission 11, namely from an initial gear to a target gear. With a procedure of this kind, an especially comfortable coupling of the internal combustion engine 3 to the electric motor 4 is possible.

The invention claimed is:

1. A method for operating a drive device for a motor vehicle, which has an internal combustion engine, an electric motor, and a gearshift transmission, comprising: a drive shaft of the internal combustion engine can be coupled by a shift clutch to a motor shaft of the electric motor and the motor shaft is coupled to a transmission input shaft of the gearshift transmission, wherein a driven shaft of the drive device is coupled to or can be coupled to a transmission output shaft of the gearshift transmission, and wherein, in a first shifting state, the shift clutch is opened or disengaged for decoupling of the internal combustion engine and the electric motor and, in a second shifting state, is closed or engaged for coupling of the internal combustion engine and the electric motor, wherein when there is a shift from the first shifting state to the second shifting state, the engaging of the shift clutch is delayed in a first operating mode when the difference between a speed gradient of the drive shaft and a speed gradient of the motor shaft exceeds a speed gradient threshold value, and/or the speed gradients have different signs, wherein during the shift from the first shifting state to the second shifting state, a shift in gear from an initial gear to a target gear is carried out by the gearshift transmission, wherein in the case of the delay in the engaging of the shift clutch, a desired speed is adjusted at the internal combustion engine, said desired speed being determined from a speed of the transmission output shaft and the target gear, and wherein the delay is terminated and the shift clutch is engaged when the actual speed corresponds to the desired speed and/or the difference is less than or equal to the speed gradient threshold value, and/or the speed gradients have the same signs.

2. The method according to claim 1, wherein the shift from the first shifting state to the second shifting state is carried out during a startup of the internal combustion engine.

3. The method according to claim 1, wherein the delay is carried out until an actual speed of the internal combustion engine corresponds to the desired speed and/or the difference between the speed gradients is less than or equal to the speed gradient threshold value, and/or the speed gradients have the same signs.

4. The method according to claim 1, wherein when there is a shift from the first shifting state to the second shifting state, the engaging of the shift clutch is carried out immediately in a second operating mode, in particular regardless of the difference between the speed gradients and/or the signs.

5. The method according to claim 4, wherein a transition from the first operating mode to the second operating mode occurs when a predetermined torque adjusted at the drive device exceeds a torque threshold value, and/or a speed difference between the speed of the drive shaft and the speed of the motor shaft is less than a speed difference threshold value, and/or a converter slippage of a torque converter of the gearshift transmission is unknown, and/or a speed signal is invalid.

6. The method according to claim 5, wherein in the second operating mode, the shift clutch is engaged before the shift in gear is carried out by means of the gearshift transmission.

* * * * *